(12) United States Patent
Schulz et al.

(10) Patent No.: US 10,112,639 B2
(45) Date of Patent: Oct. 30, 2018

(54) VEHICLE STEERING ARRANGEMENT AND METHOD OF MAKING SAME

(71) Applicant: STEERING SOLUTIONS IP HOLDING CORPORATION, Saginaw, MI (US)

(72) Inventors: John F. Schulz, Hemlock, MI (US); Richard K. Riefe, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 15/191,065

(22) Filed: Jun. 23, 2016

(65) Prior Publication Data

US 2016/0375923 A1    Dec. 29, 2016

Related U.S. Application Data

(60) Provisional application No. 62/185,108, filed on Jun. 26, 2015.

(51) Int. Cl.
| | |
|---|---|
| *B62D 1/02* | (2006.01) |
| *B62D 1/12* | (2006.01) |
| *B62D 1/22* | (2006.01) |
| *B60W 30/182* | (2012.01) |
| *B62D 1/183* | (2006.01) |

(52) U.S. Cl.
CPC .............. *B62D 1/02* (2013.01); *B60W 30/182* (2013.01); *B62D 1/12* (2013.01); *B62D 1/183* (2013.01); *B62D 1/22* (2013.01)

(58) Field of Classification Search
CPC ............... B62D 1/14; B62D 5/02; B62D 1/22
See application file for complete search history.

(56) References Cited

U.S. PATENT DOCUMENTS

| | | |
|---|---|---|
| 4,315,117 A | 2/1982 | Kokubo et al. |
| 4,337,967 A | 7/1982 | Yoshida et al. |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A * | 5/1990 | Conley .................... G05G 1/34 180/322 |
| 4,962,570 A | 10/1990 | Hosaka et al. |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

China Patent Application No. 201510204221.5 Second Office Action dated Mar. 10, 2017, 8 pages.

(Continued)

*Primary Examiner* — Nicole T Verley
(74) *Attorney, Agent, or Firm* — Cantor Colburn LLP

(57) ABSTRACT

A single vehicle steering arrangement is provided. The steering arrangement includes a steering wheel and at least one human machine interface configured to allow a human to steer the vehicle, the human machine interface being a component separate from the steering wheel.

8 Claims, 5 Drawing Sheets

(56) References Cited

U.S. PATENT DOCUMENTS

| | | | | |
|---|---|---|---|---|
| 4,967,618 | A | 11/1990 | Matsumoto et al. | |
| 4,976,239 | A | 12/1990 | Hosaka | |
| 5,240,284 | A | 8/1993 | Takada et al. | |
| 5,295,712 | A | 3/1994 | Omura | |
| 5,319,803 | A | 6/1994 | Allen | |
| 5,488,555 | A | 1/1996 | Asgari | |
| 5,618,058 | A | 4/1997 | Byon | |
| 5,668,721 | A | 9/1997 | Chandy | |
| 5,690,362 | A | 11/1997 | Peitsmeier et al. | |
| 5,765,116 | A | 6/1998 | Wilson-Jones et al. | |
| 5,893,580 | A | 4/1999 | Hoagland et al. | |
| 5,911,789 | A | 6/1999 | Keipert et al. | |
| 6,070,686 | A | 6/2000 | Pollmann | |
| 6,138,788 | A | 10/2000 | Bohner et al. | |
| 6,170,862 | B1 | 1/2001 | Hoagland et al. | |
| 6,212,453 | B1 | 4/2001 | Kawagoe et al. | |
| 6,227,571 | B1 | 5/2001 | Sheng et al. | |
| 6,256,561 | B1 | 7/2001 | Asanuma | |
| 6,301,534 | B1 | 10/2001 | McDermott, Jr. | |
| 6,354,622 | B1 | 3/2002 | Ulbrich et al. | |
| 6,360,149 | B1* | 3/2002 | Kwon | B60K 35/00 114/144 R |
| 6,373,472 | B1 | 4/2002 | Palalau et al. | |
| 6,381,526 | B1 | 4/2002 | Higashi et al. | |
| 6,390,505 | B1 | 5/2002 | Wilson | |
| 6,481,526 | B1 | 11/2002 | Millsap et al. | |
| 6,575,263 | B2 | 6/2003 | Hjelsand et al. | |
| 6,578,449 | B1 | 6/2003 | Anspaugh et al. | |
| 6,598,695 | B1 | 7/2003 | Menjak et al. | |
| 6,612,392 | B2 | 9/2003 | Park et al. | |
| 6,612,393 | B2 | 9/2003 | Bohner et al. | |
| 6,778,890 | B2 | 8/2004 | Shimakage et al. | |
| 6,799,654 | B2 | 10/2004 | Menjak et al. | |
| 6,817,437 | B2 | 11/2004 | Magnus et al. | |
| 6,819,990 | B2 | 11/2004 | Ichinose | |
| 6,820,713 | B2 | 11/2004 | Menjak et al. | |
| 7,021,416 | B2 | 4/2006 | Kapaan et al. | |
| 7,048,305 | B2 | 5/2006 | Muller | |
| 7,062,365 | B1 | 6/2006 | Fei | |
| 7,295,904 | B2 | 11/2007 | Kanevsky et al. | |
| 7,308,964 | B2 | 12/2007 | Hara et al. | |
| 7,428,944 | B2 | 9/2008 | Gerum | |
| 7,461,863 | B2 | 12/2008 | Muller | |
| 7,495,584 | B1 | 2/2009 | Sorensen | |
| 7,628,244 | B2 | 12/2009 | Chino et al. | |
| 7,719,431 | B2 | 5/2010 | Bolourchi | |
| 7,735,405 | B2 | 6/2010 | Parks | |
| 7,793,980 | B2 | 9/2010 | Fong | |
| 7,862,079 | B2 | 1/2011 | Fukawatase et al. | |
| 7,894,951 | B2 | 2/2011 | Norris et al. | |
| 7,909,361 | B2 | 3/2011 | Oblizajek et al. | |
| 8,002,075 | B2 | 8/2011 | Markfort | |
| 8,027,767 | B2 | 9/2011 | Klein et al. | |
| 8,055,409 | B2 | 11/2011 | Tsuchiya | |
| 8,069,745 | B2 | 12/2011 | Strieter et al. | |
| 8,079,312 | B2 | 12/2011 | Long | |
| 8,146,945 | B2 | 4/2012 | Born et al. | |
| 8,150,581 | B2 | 4/2012 | Iwazaki et al. | |
| 8,170,725 | B2 | 5/2012 | Chin et al. | |
| 8,260,482 | B1 | 9/2012 | Szybalski et al. | |
| 8,352,110 | B1* | 1/2013 | Szybalski | B62D 1/286 701/23 |
| 8,452,492 | B2 | 5/2013 | Buerkle et al. | |
| 8,479,605 | B2 | 7/2013 | Shavrnoch et al. | |
| 8,548,667 | B2 | 10/2013 | Kaufmann | |
| 8,606,455 | B2 | 12/2013 | Boehringer et al. | |
| 8,632,096 | B1 | 1/2014 | Quinn et al. | |
| 8,634,980 | B1 | 1/2014 | Urmson et al. | |
| 8,650,982 | B2 | 2/2014 | Matsuno et al. | |
| 8,670,891 | B1 | 3/2014 | Szybalski et al. | |
| 8,695,750 | B1* | 4/2014 | Hammond | B62D 1/22 180/403 |
| 8,725,230 | B2 | 5/2014 | Lisseman et al. | |
| 8,818,608 | B2 | 8/2014 | Cullinane et al. | |
| 8,825,258 | B2 | 9/2014 | Cullinane et al. | |
| 8,825,261 | B1 | 9/2014 | Szybalski et al. | |
| 8,843,268 | B2 | 9/2014 | Lathrop et al. | |
| 8,874,301 | B1 | 10/2014 | Rao et al. | |
| 8,880,287 | B2 | 11/2014 | Lee et al. | |
| 8,881,861 | B2 | 11/2014 | Tojo | |
| 8,899,623 | B2 | 12/2014 | Stadler et al. | |
| 8,909,428 | B1 | 12/2014 | Lombrozo | |
| 8,948,993 | B2 | 2/2015 | Schulman et al. | |
| 8,950,543 | B2 | 2/2015 | Heo et al. | |
| 8,994,521 | B2 | 3/2015 | Gazit | |
| 9,002,563 | B2 | 4/2015 | Green et al. | |
| 9,031,729 | B2 | 5/2015 | Lathrop et al. | |
| 9,032,835 | B2 | 5/2015 | Davies et al. | |
| 9,045,078 | B2 | 6/2015 | Tovar et al. | |
| 9,073,574 | B2 | 7/2015 | Cuddihy et al. | |
| 9,092,093 | B2 | 7/2015 | Jubner et al. | |
| 9,108,584 | B2 | 8/2015 | Rao et al. | |
| 9,134,729 | B1 | 9/2015 | Szybalski et al. | |
| 9,150,200 | B2 | 10/2015 | Urhahne | |
| 9,150,224 | B2 | 10/2015 | Yopp | |
| 9,159,221 | B1 | 10/2015 | Stantchev | |
| 9,164,619 | B2 | 10/2015 | Goodlein | |
| 9,174,642 | B2 | 11/2015 | Wimmer et al. | |
| 9,186,994 | B2 | 11/2015 | Okuyama et al. | |
| 9,193,375 | B2 | 11/2015 | Schramm et al. | |
| 9,199,553 | B2 | 12/2015 | Cuddihy et al. | |
| 9,227,531 | B2 | 1/2016 | Cuddihy et al. | |
| 9,233,638 | B2 | 1/2016 | Lisseman et al. | |
| 9,235,111 | B2 | 1/2016 | Davidsson et al. | |
| 9,235,211 | B2 | 1/2016 | Davidsson et al. | |
| 9,235,987 | B2 | 1/2016 | Green et al. | |
| 9,238,409 | B2 | 1/2016 | Lathrop et al. | |
| 9,248,743 | B2 | 2/2016 | Enthaler et al. | |
| 9,260,130 | B2 | 2/2016 | Mizuno | |
| 9,290,174 | B1 | 3/2016 | Zagorski | |
| 9,290,201 | B1 | 3/2016 | Lombrozo | |
| 9,298,184 | B2 | 3/2016 | Bartels et al. | |
| 9,308,857 | B2 | 4/2016 | Lisseman et al. | |
| 9,308,891 | B2 | 4/2016 | Cudak et al. | |
| 9,333,983 | B2 | 5/2016 | Lathrop et al. | |
| 9,360,865 | B2 | 6/2016 | Yopp | |
| 9,725,098 | B2 | 8/2017 | Abou-Nasr et al. | |
| 9,810,727 | B2 | 11/2017 | Kandler et al. | |
| 9,852,752 | B1 | 12/2017 | Chou et al. | |
| 9,868,449 | B1 | 1/2018 | Holz et al. | |
| 2003/0046012 | A1 | 3/2003 | Yamaguchi | |
| 2003/0094330 | A1 | 5/2003 | Boloorchi et al. | |
| 2003/0227159 | A1 | 12/2003 | Muller | |
| 2004/0016588 | A1* | 1/2004 | Vitale | B60K 37/00 180/322 |
| 2004/0046346 | A1 | 3/2004 | Eki et al. | |
| 2004/0099468 | A1 | 5/2004 | Chernoff et al. | |
| 2004/0129098 | A1 | 7/2004 | Gayer et al. | |
| 2004/0204808 | A1 | 10/2004 | Satoh et al. | |
| 2004/0262063 | A1 | 12/2004 | Kaufmann et al. | |
| 2005/0001445 | A1 | 1/2005 | Ercolano | |
| 2005/0081675 | A1 | 4/2005 | Oshita et al. | |
| 2005/0155809 | A1 | 7/2005 | Krzesicki et al. | |
| 2005/0197746 | A1 | 9/2005 | Pelchen et al. | |
| 2005/0275205 | A1* | 12/2005 | Ahnafield | B62D 1/043 280/771 |
| 2006/0224287 | A1 | 10/2006 | Izawa et al. | |
| 2006/0244251 | A1 | 11/2006 | Muller | |
| 2006/0271348 | A1 | 11/2006 | Rossow et al. | |
| 2007/0021889 | A1 | 1/2007 | Tsuchiya | |
| 2007/0029771 | A1 | 2/2007 | Haglund et al. | |
| 2007/0046003 | A1 | 3/2007 | Mori et al. | |
| 2007/0046013 | A1 | 3/2007 | Bito | |
| 2007/0241548 | A1 | 10/2007 | Fong | |
| 2007/0284867 | A1 | 12/2007 | Cymbal et al. | |
| 2008/0009986 | A1 | 1/2008 | Lu et al. | |
| 2008/0238068 | A1 | 10/2008 | Kumar et al. | |
| 2009/0024278 | A1 | 1/2009 | Kondo et al. | |
| 2009/0189373 | A1 | 7/2009 | Schramm et al. | |
| 2009/0256342 | A1 | 10/2009 | Cymbal et al. | |
| 2009/0276111 | A1 | 11/2009 | Wang et al. | |
| 2009/0292466 | A1 | 11/2009 | McCarthy et al. | |
| 2010/0152952 | A1 | 6/2010 | Lee et al. | |
| 2010/0222976 | A1 | 9/2010 | Haug | |

(56) References Cited

U.S. PATENT DOCUMENTS

| | | |
|---|---|---|
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1* | 11/2011 | Tada .................. B62D 1/02 701/41 |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0028008 A1* | 1/2014 | Stadler ................ B62D 1/192 280/777 |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1* | 1/2015 | Eisenbarth ............ B62D 1/22 180/405 |
| 2015/0032322 A1 | 1/2015 | Wimmer |
| 2015/0032334 A1 | 1/2015 | Jang |
| 2015/0051780 A1 | 2/2015 | Hahne |
| 2015/0060185 A1* | 3/2015 | Feguri .................. B60T 7/10 180/333 |
| 2015/0120141 A1 | 4/2015 | Lavoie et al. |
| 2015/0120142 A1 | 4/2015 | Park et al. |
| 2015/0123947 A1 | 5/2015 | Jubner et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0338849 A1 | 11/2015 | Nemec et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer et al. |
| 2016/0375860 A1 | 12/2016 | Lubischer |
| 2016/0375925 A1* | 12/2016 | Lubischer ............ G05D 1/0061 701/41 |
| 2016/0375926 A1* | 12/2016 | Lubischer ............ B62D 1/183 74/493 |
| 2016/0375927 A1* | 12/2016 | Schulz ................ B62D 1/183 280/775 |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113712 A1 | 4/2017 | Watz |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0225704 A1 | 8/2017 | Urushibata |
| 2017/0240204 A1 | 8/2017 | Raad et al. |
| 2017/0293306 A1 | 10/2017 | Riefe et al. |
| 2017/0297606 A1 | 10/2017 | Kim et al. |
| 2017/0305458 A1 | 10/2017 | Wang et al. |
| 2018/0029632 A1 | 2/2018 | Bodtker et al. |
| 2018/0072341 A1 | 3/2018 | Schulz et al. |
| 2018/0093700 A1 | 4/2018 | Chandy |
| 2018/0105198 A1 | 4/2018 | Bodtker et al. |
| 2018/0107214 A1 | 4/2018 | Chandy |
| 2018/0136727 A1 | 5/2018 | Chandy |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A | 1/2012 |
| CN | 102452391 A | 5/2012 |
| CN | 202563346 U | 11/2012 |
| CN | 103158699 A | 6/2013 |
| CN | 103419840 A2 | 12/2013 |
| CN | 103448785 A | 12/2013 |
| CN | 103677253 A | 3/2014 |
| CN | 104024084 A | 9/2014 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 * | 7/2015 ............ B62D 1/18 |
| JP | S60157963 A | 8/1985 |
| JP | S60164629 A | 8/1985 |
| JP | H05162652 A | 6/1993 |
| JP | 2007253809 A | 10/2007 |
| JP | 20174099 A | 1/2017 |
| KR | 20100063433 A | 6/2010 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

(56) References Cited

FOREIGN PATENT DOCUMENTS

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Office Action regarding related CN App. No. 10204221.5; dated Aug. 29, 2016.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
CN Patent Application No. 201610575225.9 First Office Action dated Jan. 22, 2018, 10 pages.
English Translation of Chinese Office Action and Search Report for Chinese Application No. 2016103666609.X dated Dec. 20, 2017, 8 pages.
English Translation of Chinese Office Action and Search Report for Chinese Application No. 201610832736.4 dated Mar. 22, 2018, 6 pages.

\* cited by examiner

VEHICLE STEERING ARRANGEMENT AND METHOD OF MAKING SAME

CROSS REFERENCE TO RELATED APPLICATION

This patent application claims priority to U.S. Provisional Patent Application Ser. No. 62/185,108, filed Jun. 26, 2015, which is incorporated herein by reference in its entirety.

BACKGROUND

The embodiments described herein relate to vehicle steering arrangements and a method of making such arrangements.

Vehicles are provided with a steering wheel that allows a human operator to directionally control the vehicle. The steering wheel may be referred to as a human machine interface (HMI). The steering wheel is traditionally the sole HMI available for a human operator to utilize to directionally control the vehicle.

As the automotive industry advances technologically toward autonomous driving assist systems, the steering wheel may not need to be manually manipulated by a driver at all times of vehicle operation. As such, different steering systems may be employed that substitute for, or complement, traditional steering wheels.

SUMMARY

According to one aspect of the disclosure, a single vehicle steering arrangement is provided. The steering arrangement includes a steering wheel and at least one human machine interface configured to allow a human to steer the vehicle, the human machine interface being a component separate from the steering wheel.

According to another aspect of the disclosure, a steering system for an autonomous vehicle is provided and includes a steering wheel providing directional control of the autonomous vehicle in a first condition, the steering wheel moveable between an extended position and a retracted position. Also included is a human machine interface providing directional control of the autonomous vehicle in a second condition, the human machine interface located closer in proximity to a hand of a human operator relative to a distance between the steering wheel in the retracted position and the hand of the human operator. Further included is an autonomous driving assist steering system providing directional control of the autonomous vehicle in a third condition, the third condition comprising an autonomous driving mode.

According to yet another aspect of the disclosure, a method of making a vehicle steering arrangement is provided. The method includes providing a steering wheel in mechanical operable steering linkage to a vehicle. The method also includes providing a steer-by-wire steering system in the vehicle. The method further includes operably connecting at least one human machine interface other than the steering wheel to the vehicle. The method yet further includes connecting the at least one human machine interface to the steer-by-wire system.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
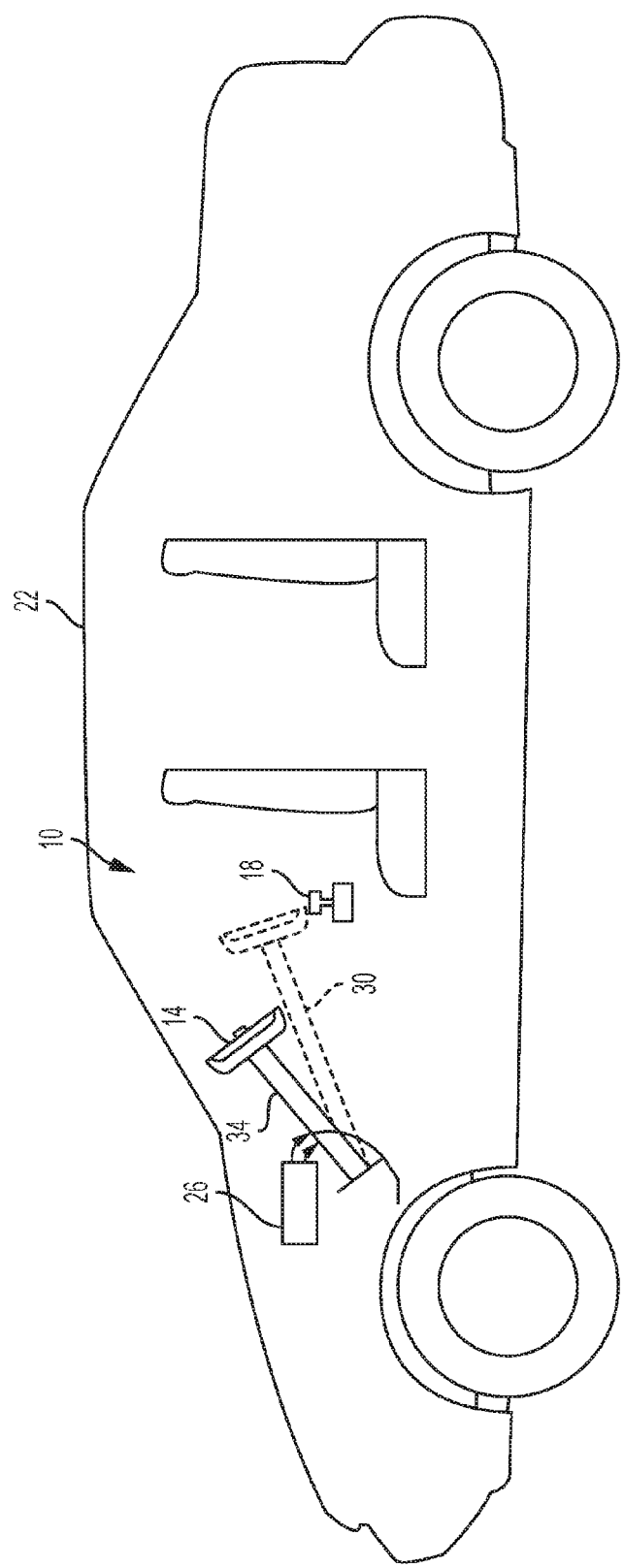
FIG. 1 depicts a schematic view of vehicle with a vehicle steering arrangement.

Referring now to the Figures, where the invention will be described with reference to specific embodiments, without limiting same, FIG. 1 depicts a vehicle steering arrangement 10. The vehicle steering arrangement 10 includes a steering wheel 14, which may be considered a first human machine interface. The vehicle steering arrangement 10 also includes at least one human machine interface 18 in addition to, and separate and distinct from, the steering wheel 14, with the at least one human machine interface 18 being considered a second human machine interface. The steering wheel 14 and the human machine interface 18 are configured to allow a human to steer a vehicle 22. Two possible human machine interfaces 18A and 18B are illustrated herein and described in greater detail below.

In some embodiments, the vehicle 22 includes a steer-by-wire system 26. The steer-by-wire system 26 employs a control system and servos (not shown) that interface with the vehicle 22 such that the vehicle 22 can be steered without mechanical linkage to the steering wheel 14, for example. In some embodiments, the steer-by-wire system 26 is part of an autonomous driving assisted steering (ADAS) system that is able to steer as well as control other parameters of the vehicle 22 to operate it without direct driver involvement. Autonomous or semi-autonomous driving refers to vehicles that are configured to perform operations without continuous input from a driver (e.g., steering, accelerating, braking etc.) and may be equipped with technology that allows the vehicle to be autonomously or semi-autonomously controlled using sensing, steering, and/or braking technology.

The human machine interface 18 is operationally connected to the steer-by-wire system 26 such that manipulation of the human machine interface 18 steers the vehicle 22 in at least one driving condition. Additionally, in some embodiments the steering wheel 14 is also in operable communication with the steer-by-wire system 26.

The steering wheel 14 and the at least one additional human machine interface 18 can be redundantly employed to steer the vehicle 22, such that the steering wheel 14 can continue to operate and thus steer the vehicle 22 when the additional human machine interface 18 is not available. Alternately, the additional human machine interface 18 can continue to operate when the steering wheel 14 is not available, or vice versa. It should be pointed out, however, that the steering wheel 14 can also be mechanically operationally connected to the vehicle 22 to steer the vehicle 22 even if both the steer-by-wire system 26 and the autonomous driving assisted steering system were to both be unavailable (e.g., malfunction event) at the same time.

When the steering wheel 14 is not being employed by an operator the steering wheel 14 can be retracted out of its extended steering position 30 (shown with dashed lines in FIG. 1) to a retracted position 34 (shown in solid lines in FIG. 1) when the vehicle 22 is being steered by the additional human machine interface 18 or the autonomous driving assisted steering system. The additional human machine interface 18 is positioned, sized and configured such that it can be more quickly accessed to take control of steering the vehicle 22 than the steering wheel 14, particularly when the steering wheel 14 is in the retracted position 34. In other words, the human machine interface 18 is located closer in proximity to a hand of a human operator, when compared to a distance between the steering wheel 14 in the retracted position 34 and the hand of the human operator. Such positioning allows the human operator to quickly take steering control of the vehicle 22, as needed.

Figure 2:
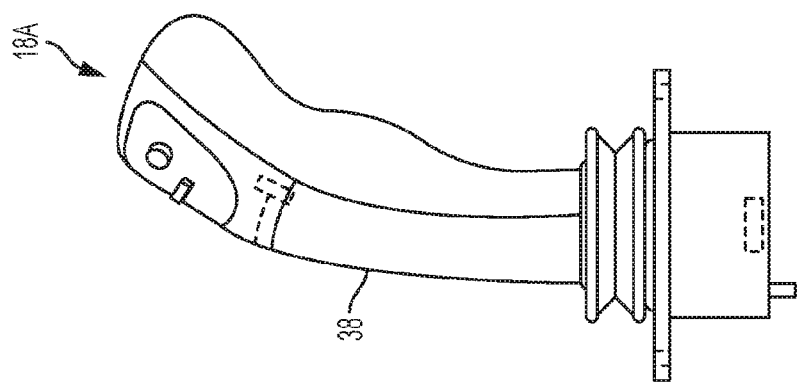
FIG. 2 depicts a perspective view of an embodiment of a human machine interface of the vehicle steering arrangement.

Referring to FIG. 2, an embodiment of the at least one additional human machine interface 18A is shown as a joystick 18A. The joystick 18A can be configured to cause the steer-by-wire system 26 to turn the vehicle 22 in a direction corresponding to a direction in which the handle 38 is tilted or pivoted. The sharpness of the turn can be proportional to an angle that the handle 38 is displaced from a neutral position.

Figure 3:
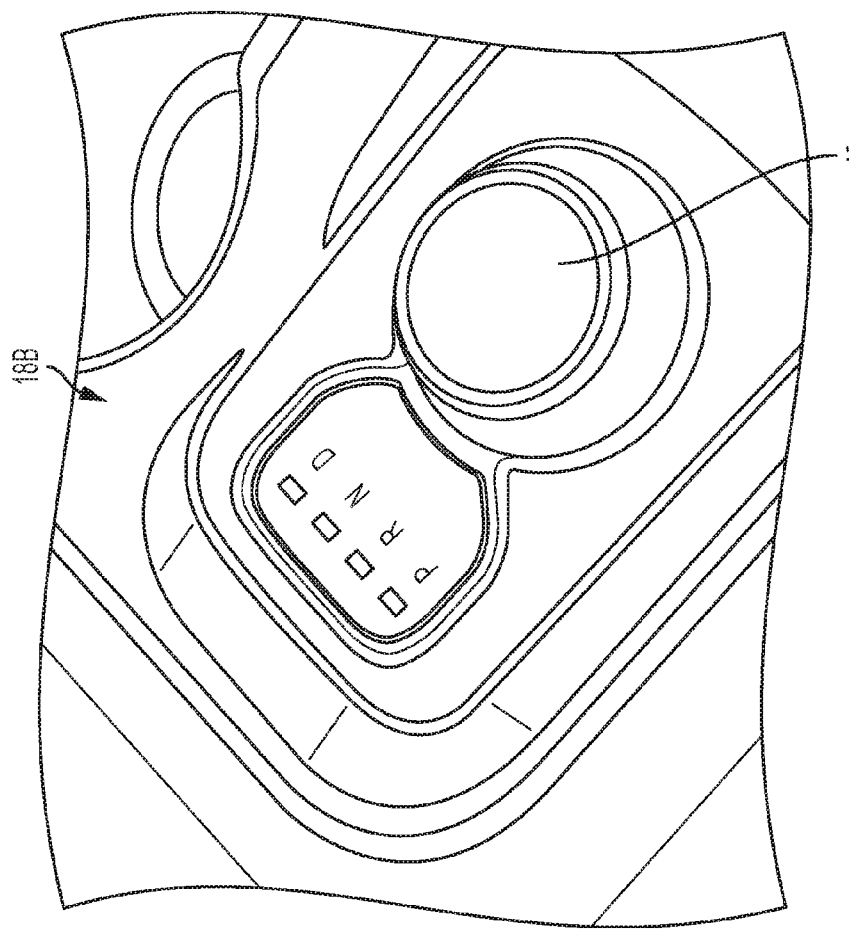
FIG. 3 depicts a perspective view of another embodiment of the human machine interface of the vehicle steering arrangement.

Referring to FIG. 3, an embodiment of the at least one additional human machine interface 18B is shown as a dial. The dial 18B can be configured to cause the steer-by-wire system 26 to turn the vehicle 22 in a direction corresponding to a direction of rotation of the disk 42 of the dial 18B. The sharpness of the turn can be proportional to an angle that the disk 42 is rotated relative to a neutral position.

The above-described human machine interfaces 18A, 18B are merely examples of the human machine interface 18 and are not intended to be limiting, as any suitable alternative interface may be employed. In particular, any device positioned proximate the human operator and capable of interacting with the vehicle 22 to effectively provide steering control to a human operator is suitable.

Figure 4:
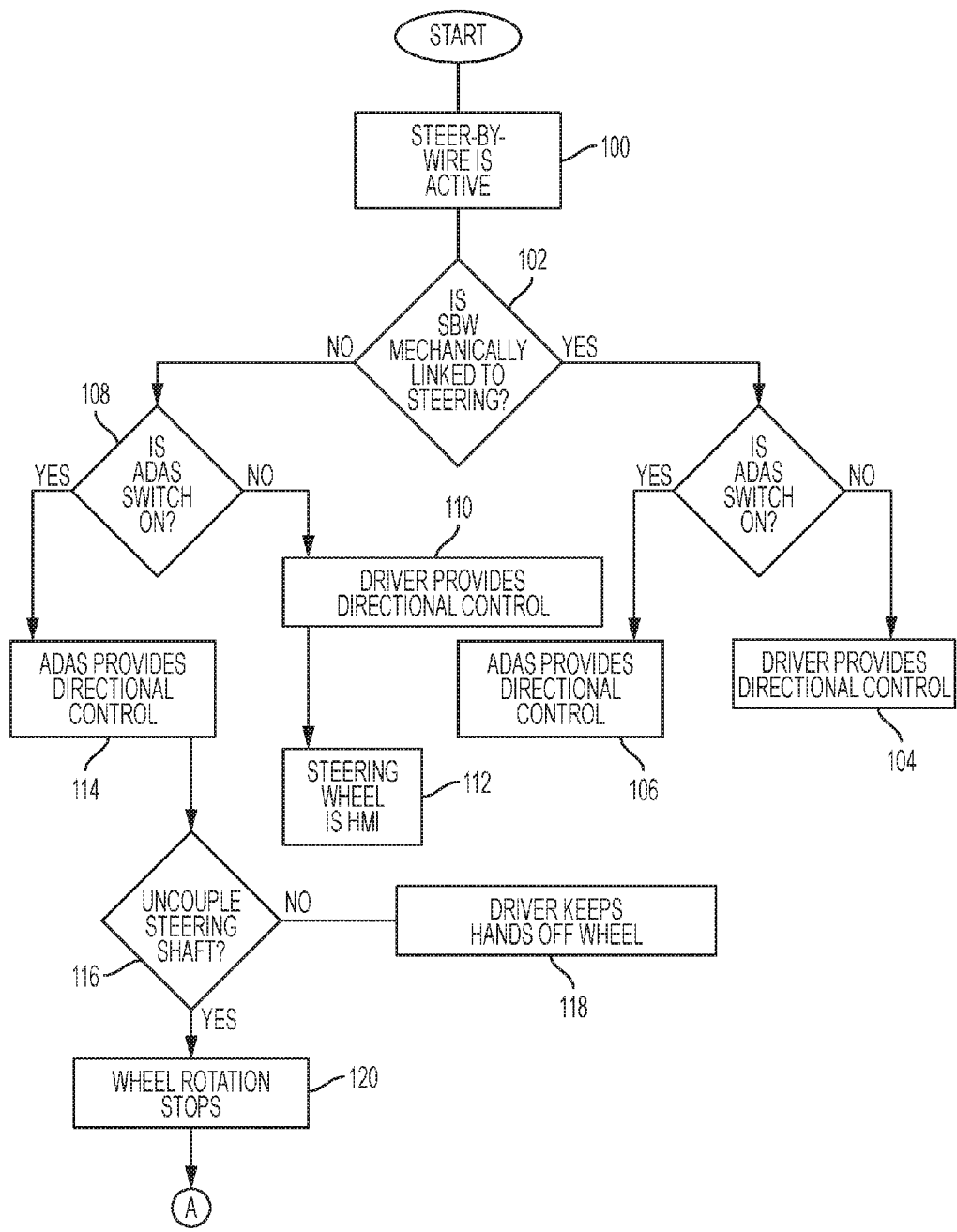
FIG. 4 is a flow diagram illustrating a method of operating the vehicle steering arrangement.
Figure 4:
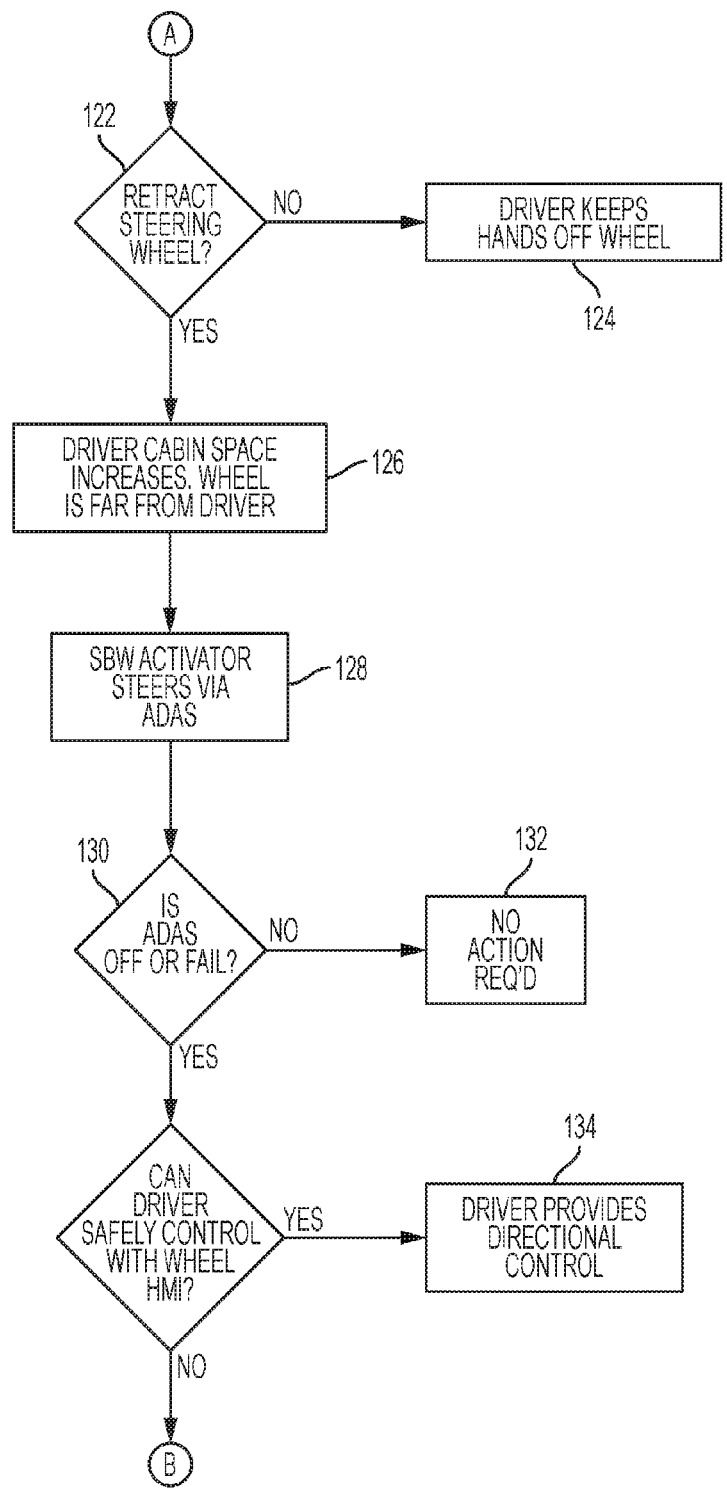
Figure 4:
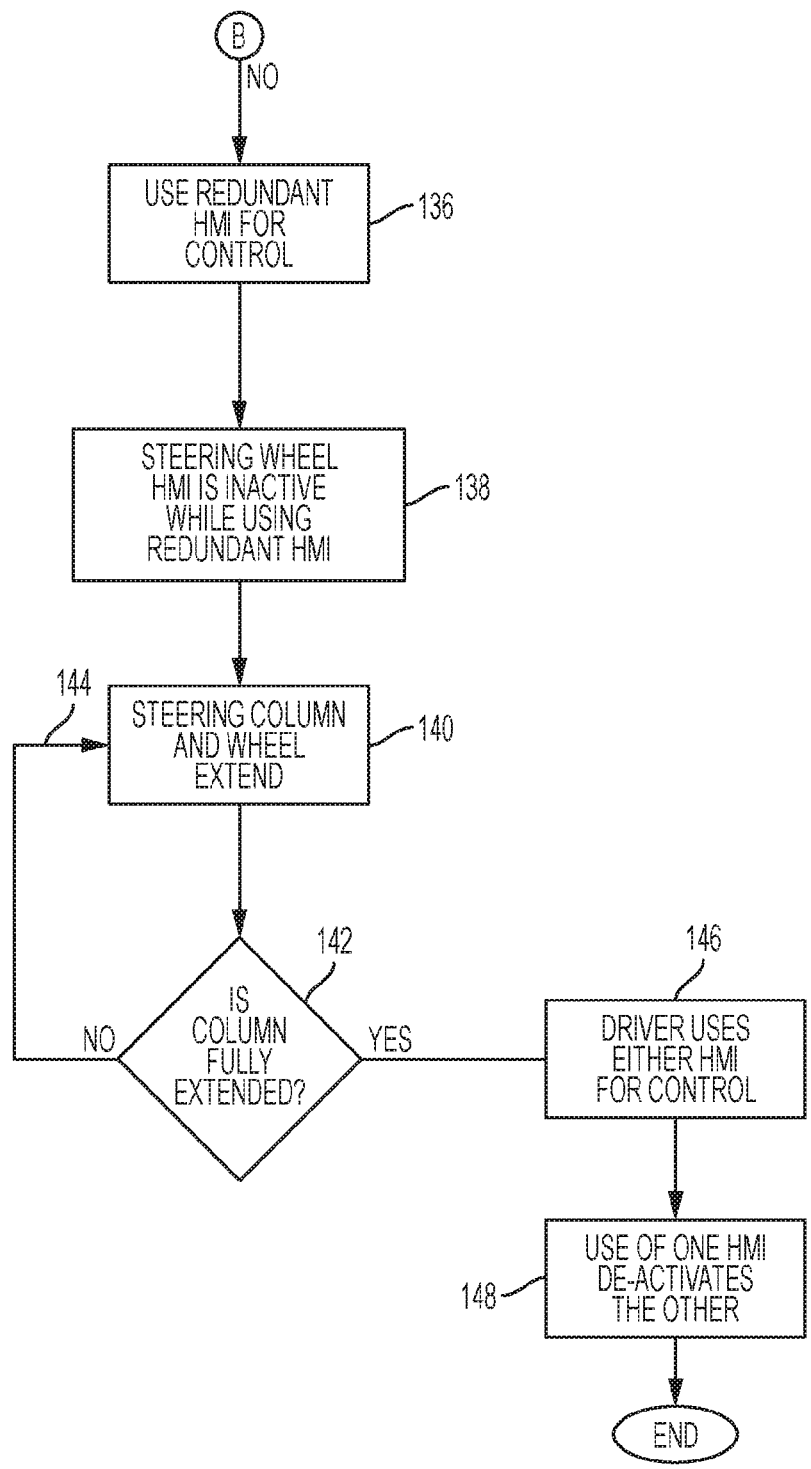

Referring now to FIG. 4, a flow diagram illustrates operation of the steering arrangement according to an embodiment. In a condition where the steer-by-wire system is active 100, a processing device or controller determines whether the steer-by-wire system is mechanically linked to the components 102. If so, the driver provides directional control when the ADAS system is not activated 104 and the ADAS system provides directional control if the ADAS system is activated 106. If not, a determination is made regarding whether the ADAS system is activated 108. If not activated, the driver provides directional control 110 and the steering wheel is the human machine interface employed by the driver to do so 112. If activated, the ADAS system provides directional control 114 and a determination is made whether a steering shaft is operatively uncoupled from the steering wheel 116. If it is not, the steering wheel continues to rotate and the driver is to keep hand(s) off the steering wheel 118. If uncoupled, steering wheel rotation stops 120.

As described above, the steering wheel 14 may be moved from an extended steering position 30 to a retracted position 34 to provide more cabin space within the vehicle 22. A determination is made whether the steering wheel is in the retracted position 122. If in the extended position, the driver is to keeps hand(s) off the steering wheel 124. If in the retracted position, the cabin space of the vehicle increases and the steering wheel is distanced from the hands of the driver 126 and the steer-by-wire system is controlled by the ADAS system to steer the vehicle 128. During this condition, monitoring determines whether the ADAS system is turned off or fails 130. During continued normal operation of the ADAS system, no action is required and monitoring continues 132. If an "off" condition or failure is detected, the driver can provide directional control with the steering wheel if the driver can safely provide such control with the steering wheel 134. If unable to do so, such as when the steering wheel is in the retracted position, the driver utilizes the human machine interface (i.e., redundant HMI) to provide directional control 136. While using the redundant HMI, the steering wheel is inactive 138. Upon driver prompt or an automated process, the steering column and wheel extend from the retracted position to the extended position 140. During such movement, the column and wheel position is monitored 142. If the steering wheel is not in the fully extended position, extension continues 144. Upon reaching the fully extended position, the driver may utilize either HMI (i.e., steering wheel or redundant HMI) for directional control 146. Use of one HMI de-activates the other HMI 148.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering arrangement for a vehicle, comprising:
   a steering wheel; and
   at least one human machine interface configured to allow a human to steer the vehicle, the human machine interface being a component separate from the steering wheel, the at least one human machine interface in operable communication with a steer-by-wire system of the vehicle, the steering wheel in operable communication with the steer-by-wire system of the vehicle, the steering wheel and the at least one human machine interface independently rotatable relative to each other.

2. The vehicle steering arrangement of claim 1, wherein the at least one human machine interface comprises a dial.

3. The vehicle steering arrangement of claim 1, wherein the steering wheel and the at least one human machine interface are redundantly employed to steer the vehicle.

4. The vehicle steering arrangement of claim 1, wherein the steering wheel continues to operate when the additional human machine interface is not available.

5. The vehicle steering arrangement of claim 1, wherein the additional human machine interface continues to operate when the steering wheel is not available.

6. The vehicle steering arrangement of claim 1, wherein the steering wheel is retractable out of an extended steering position to a retracted position when the vehicle is being steered by an autonomous driver assisted steering system.

7. A steering arrangement for a vehicle, comprising:
   a steering wheel; and
   at least one human machine interface configured to allow a human to steer the vehicle, the human machine interface being a component separate from the steering wheel, the steering wheel being retractable out of an extended steering position to a retracted position when the vehicle is being steered by the additional human machine interface, the human machine interface located closer in proximity to a seat back of a driver's seat relative to a distance between the retracted position of the steering wheel and the seat back of the driver's seat.

8. The vehicle steering arrangement of claim 7, wherein the steering wheel is mechanically operationally connected to steered wheels of the vehicle.

\* \* \* \* \*